(12) United States Patent
Kurup et al.

(10) Patent No.: US 11,687,329 B2
(45) Date of Patent: Jun. 27, 2023

(54) DATA CENTER INFRASTRUCTURE FUNGIBILITY AND BOOTSTRAPPING

(71) Applicant: JPMorgan Chase Bank, N.A., New York, NY (US)

(72) Inventors: Rejith G. Kurup, Morganville, NJ (US); Keith Billis, Franklin Lakes, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 115 days.

(21) Appl. No.: 17/202,809

(22) Filed: Mar. 16, 2021

(65) Prior Publication Data

US 2021/0286607 A1 Sep. 16, 2021

Related U.S. Application Data

(60) Provisional application No. 62/990,214, filed on Mar. 16, 2020.

(51) Int. Cl.
*G06F 1/24* (2006.01)
*G06F 8/61* (2018.01)
*G06F 8/658* (2018.01)
*G06F 15/177* (2006.01)
*G06F 9/4401* (2018.01)

(52) U.S. Cl.
CPC ............... *G06F 8/61* (2013.01); *G06F 8/658* (2018.02); *G06F 15/177* (2013.01); *G06F 9/4401* (2013.01)

(58) Field of Classification Search
CPC .................................................. G06F 11/2035
See application file for complete search history.

(56) References Cited

U.S. PATENT DOCUMENTS

| | | | | |
|---|---|---|---|---|
| 9,652,326 B1* | 5/2017 | Bauer | ................ | G06F 11/2035 |
| 2006/0277025 A1* | 12/2006 | Iszlai | ........................ | G06F 8/60 703/23 |
| 2012/0117422 A1* | 5/2012 | Radhakrishnan | ... | G06F 11/0793 714/15 |
| 2014/0215259 A1* | 7/2014 | Crabtree, Jr. | ......... | G06F 11/202 714/4.11 |

* cited by examiner

*Primary Examiner* — Nitin C Patel
(74) *Attorney, Agent, or Firm* — Greenblum & Bernstein, P.L.C.

(57) ABSTRACT

A system and a method for reconstructing an electronic data processing facility is provided. The method includes: accessing information that indicates a predetermined arrangement of hardware components included in the electronic data processing facility; verifying that the hardware components are operational based on the predetermined arrangement; accessing information that indicates a predetermined order of software modules to be installed in the electronic data processing facility; installing the software modules based on the predetermined order; accessing information that indicates a predetermined data set to be stored in a memory of the electronic data processing facility; and verifying that the installed software modules and the stored data set are operational based on a predetermined standard.

20 Claims, 7 Drawing Sheets

DATA CENTER INFRASTRUCTURE FUNGIBILITY AND BOOTSTRAPPING

CROSS-REFERENCE TO RELATED APPLICATIONS

This application claims the benefit of U.S. Provisional Patent Application Ser. No. 62/990,214, filed Mar. 16, 2020, which is hereby incorporated by reference in its entirety.

BACKGROUND

1. Field of the Disclosure

This technology generally relates to methods and systems for reconstructing a data center, and more particularly to methods and systems for efficiently providing the necessary services for a fully functional data center in response to a disabling event or interruption.

2. Background Information

Today, many organizations rely on electronic data processing facilities via the use of computer platforms and networks. However, such facilities are vulnerable to various types of problems that may cause interruptions, such as, for example, security breaches, cyber attacks, and/or other circumstances that may render a facility untrusted or unusable.

When such a situation occurs, there is an urgent need to reconstruct the affected electronic data processing facility as rapidly as possible, in order to avoid catastrophic losses of data and/or resources. However, the reconstruction of the facility must also be performed in a safe, consistent, and verifiable manner.

Accordingly, there is a need for a method and system for efficiently providing the necessary services for a fully functional data center in response to a disabling event or interruption in order to ensure that business operations can be reliably available with minimal disruption.

SUMMARY

The present disclosure, through one or more of its various aspects, embodiments, and/or specific features or sub-components, provides, inter alia, various systems, servers, devices, methods, media, programs, and platforms for reconstructing a data center in response to a disabling event or interruption.

According to an aspect of the present disclosure, a method for reconstructing an electronic data processing facility is provided. The method is implemented by at least one processor. The method includes: accessing, by the at least one processor, information that indicates a predetermined arrangement of hardware components included in the electronic data processing facility; verifying, by the at least one processor, that the hardware components are operational based on the predetermined arrangement; accessing, by the at least one processor, information that indicates a predetermined order of software modules to be installed in the electronic data processing facility; installing, by the at least one processor, the software modules based on the predetermined order; accessing, by the at least one processor, information that indicates a predetermined data set to be stored in a memory of the electronic data processing facility; and verifying, by the at least one processor, that the installed software modules and the stored data set are operational based on a predetermined standard.

The predetermined order of software modules may include a first subset of dedicated infrastructure modules and a second subset of virtual modules. Each of the dedicated infrastructure modules may be installed before installing any of the virtual modules.

Each of the information that indicates the predetermined arrangement of hardware components, the information that indicates the predetermined order of software modules to be installed, the information that indicates the predetermined data set to be stored, and the predetermined standard may be stored in a recovery pod database.

The method may further include periodically updating the information stored in the recovery pod database by: connecting the recovery pod database to the electronic data processing facility; disconnecting the electronic data processing facility from an external network such that inbound communications are disabled; obtaining, from the electronic data processing facility, a latest version of the information stored in the recovery pod database; reconnecting the electronic data processing facility to the external network such that inbound communications are receivable; and disconnecting the recovery pod database from the electronic data processing facility.

The information that indicates the predetermined arrangement of hardware components may include at least one instruction for ensuring that the hardware components are physically arranged and electrically connected in a correct manner.

The predetermined order of software modules may be based on a hierarchy of software levels that includes a lowest level that is to be installed before a second lowest level and a highest level that is to be installed after a second highest level.

The lowest level of the hierarchy of software levels may include software modules that relate to a network on which the electronic data processing facility resides.

The second lowest level of the hierarchy of software levels may include a recovery pod of software modules that stores a backup version of the electronic data processing facility and a base management cluster of software modules that implements a fully automated bootstrap of all components of the electronic data processing facility based on the stored backup version of the electronic data processing facility.

A third lowest level of the hierarchy of software levels may include software modules that relate to Global Technology Infrastructure (GTI) Platform as a Service (PAAS) services, software modules that relate to GTI enabling services, and software modules that relate to hosting infrastructure.

The highest level of the hierarchy of software levels may include software modules that relate to workload applications and functionalities corresponding to a predetermined line of business.

According to another exemplary embodiment, a computing apparatus for reconstructing an electronic data processing facility is provided. The computing apparatus includes a processor; a memory; and a communication interface coupled to each of the processor and the memory. The processor is configured to: access, via the communication interface, information that indicates a predetermined arrangement of hardware components included in the electronic data processing facility; verify that the hardware components are operational based on the predetermined arrangement; access, via the communication interface, information that indicates a predetermined order of software modules to be installed in the electronic data processing facility; install the software modules based on the predetermined order; access, via the communication interface, information that indicates a predetermined data set to be stored in a memory of the electronic data processing facility; and verify that the installed software modules and the stored data set are operational based on a predetermined standard.

The predetermined order of software modules may include a first subset of dedicated infrastructure modules and a second subset of virtual modules. Each of the dedicated infrastructure modules may be installed before installing any of the virtual modules.

Each of the information that indicates the predetermined arrangement of hardware components, the information that indicates the predetermined order of software modules to be installed, the information that indicates the predetermined data set to be stored, and the predetermined standard may be stored in a recovery pod database included in the memory.

The processor may be further configured to periodically update the information stored in the recovery pod database by: connecting the recovery pod database to the electronic data processing facility via the communication interface; disconnecting the electronic data processing facility from an external network such that inbound communications are disabled; obtaining, from the electronic data processing facility via the communication interface, a latest version of the information stored in the recovery pod database; reconnecting the electronic data processing facility to the external network via the communication interface such that inbound communications are receivable; and disconnecting the recovery pod database from the electronic data processing facility.

The information that indicates the predetermined arrangement of hardware components may include at least one instruction for ensuring that the hardware components are physically arranged and electrically connected in a correct manner.

The predetermined order of software modules may be based on a hierarchy of software levels that includes a lowest level that is to be installed before a second lowest level and a highest level that is to be installed after a second highest level.

The lowest level of the hierarchy of software levels may include software modules that relate to a network on which the electronic data processing facility resides.

The second lowest level of the hierarchy of software levels may include a recovery pod of software modules that stores a backup version of the electronic data processing facility and a base management cluster of software modules that implements a fully automated bootstrap of all components of the electronic data processing facility based on the stored backup version of the electronic data processing facility.

A third lowest level of the hierarchy of software levels may include software modules that relate to Global Technology Infrastructure (GTI) Platform as a Service (PAAS) services, software modules that relate to GTI enabling services, and software modules that relate to hosting infrastructure.

The highest level of the hierarchy of software levels may include software modules that relate to workload applications and functionalities corresponding to a predetermined line of business.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
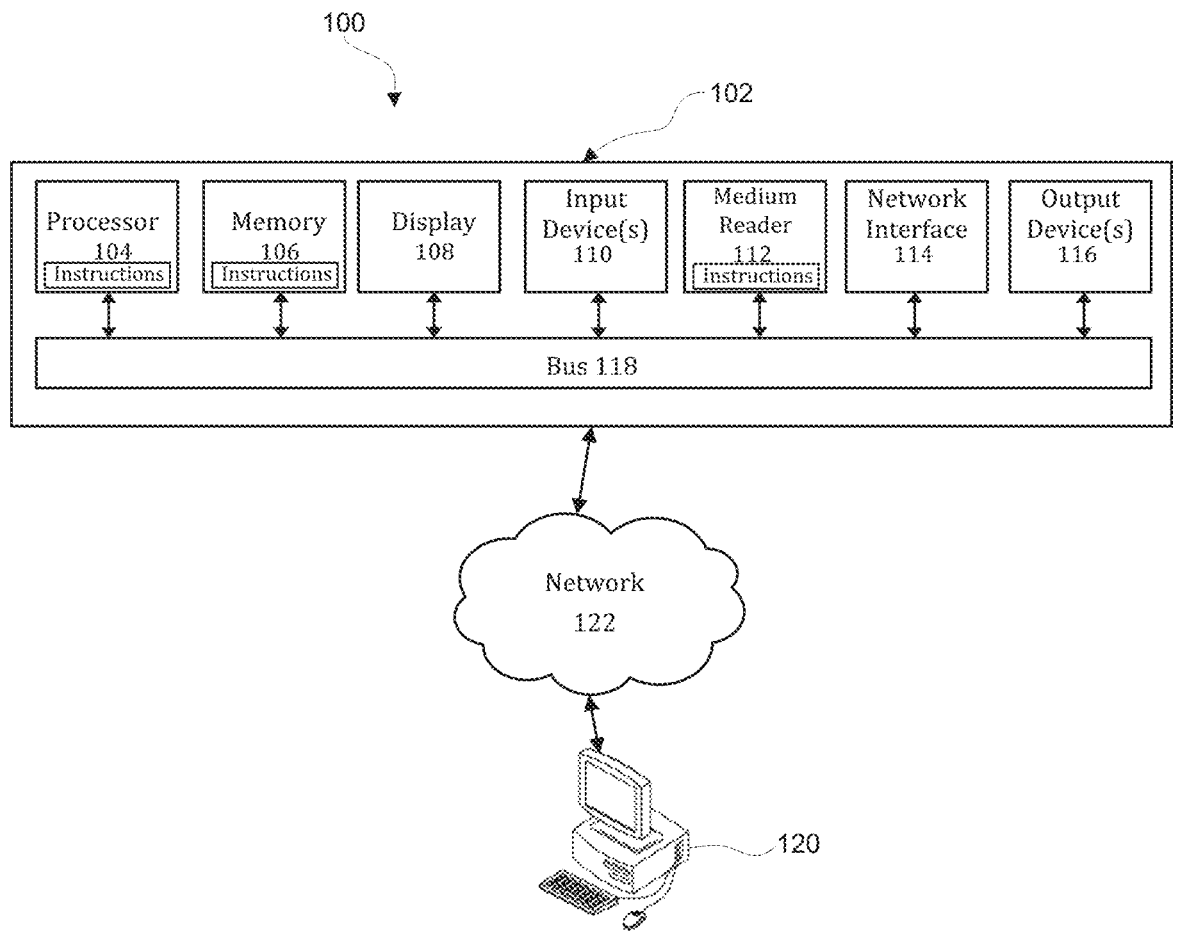
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for reconstructing a data center in response to a disabling event or interruption.

Figure 2:
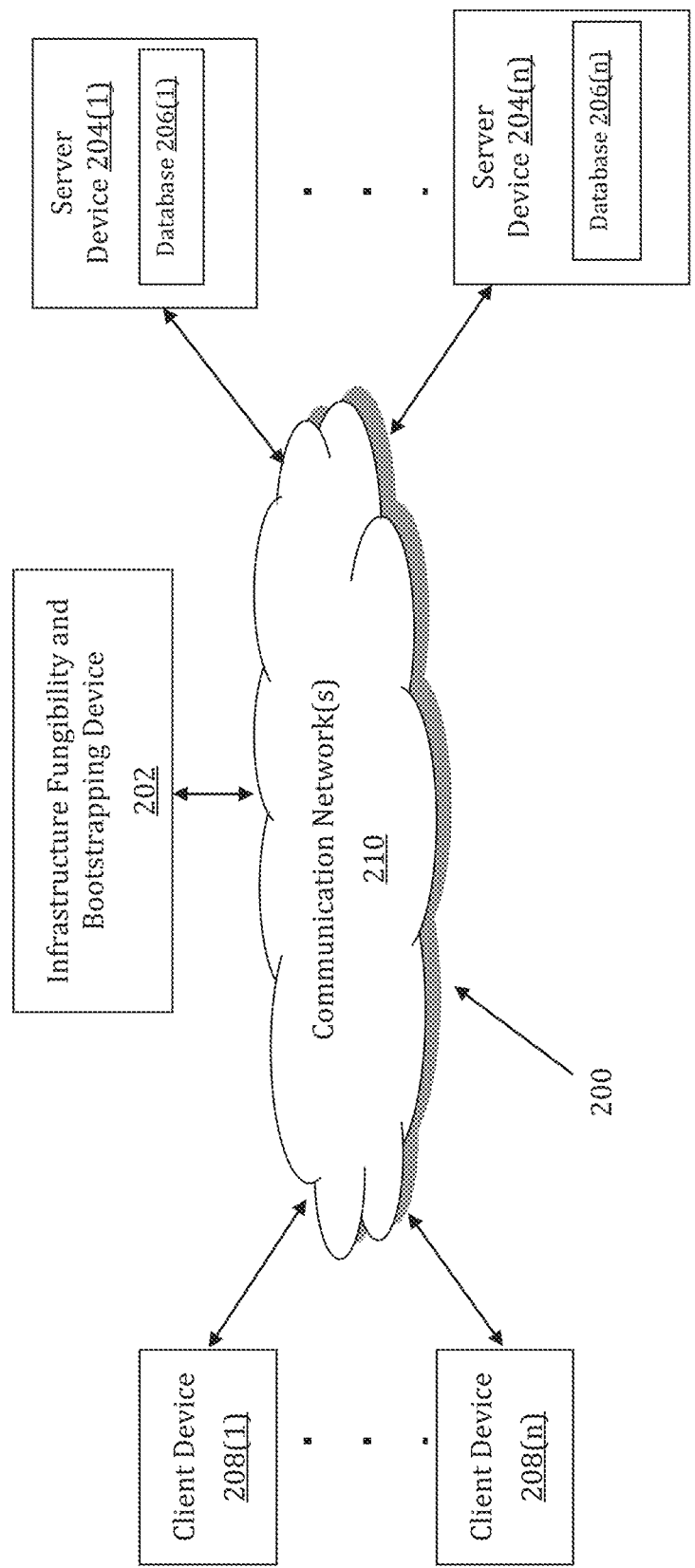
FIG. 2 illustrates an exemplary diagram of a network environment.

Referring to FIG. 2, a schematic of an exemplary network environment 200 for implementing a method for reconstructing a data center in response to a disabling event or interruption is illustrated. In an exemplary embodiment, the method is executable on any networked computer platform, such as, for example, a personal computer (PC).

The method for reconstructing a data center in response to a disabling event or interruption may be implemented by an Infrastucture Fungibility and Bootstrapping (IFB) device 202. The IFB device 202 may be the same or similar to the computer system 102 as described with respect to FIG. 1. The IFB device 202 may store one or more applications that can include executable instructions that, when executed by the IFB device 202, cause the IFB device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IFB device 202 itself, may be located in virtual server(s) running in a cloud-based computing environment rather than being tied to one or more specific physical network computing devices. Also, the application(s) may be running in one or more virtual machines (VMs) executing on the IFB device 202. Additionally, in one or more embodiments of this technology, virtual machine(s) running on the IFB device 202 may be managed or supervised by a hypervisor.

In the network environment 200 of FIG. 2, the IFB device 202 is coupled to a plurality of server devices 204(1)-204(n) that hosts a plurality of databases 206(1)-206(n), and also to a plurality of client devices 208(1)-208(n) via communication network(s) 210. A communication interface of the IFB device 202, such as the network interface 114 of the computer system 102 of FIG. 1, operatively couples and communicates between the IFB device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IFB device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IFB devices that efficiently implement a method for reconstructing a data center in response to a disabling event or interruption.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IFB device 202 may be a standalone device or integrated with one or more other devices or apparatuses, such as one or more of the server devices 204(1)-204(n), for example. In one particular example, the IFB device 202 may include or be hosted by one of the server devices 204(1)-204(n), and other arrangements are also possible. Moreover, one or more of the devices of the IFB device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IFB device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data center recovery and reconstruction, infrastructure fungibility and bootstrapping, and application data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the IFB device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IFB device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IFB device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IFB device 202, the server devices 204(1)-204(n), or the client devices 208(1)-208(n), for example, may be configured to operate as virtual instances on the same physical machine. In other words, one or more of the IFB device 202, the server devices 204(1)-204(n), or the client devices 208(1)-208(n) may operate on the same physical device rather than as separate devices communicating through communication network(s) 210. Additionally, there may be more or fewer IFB devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
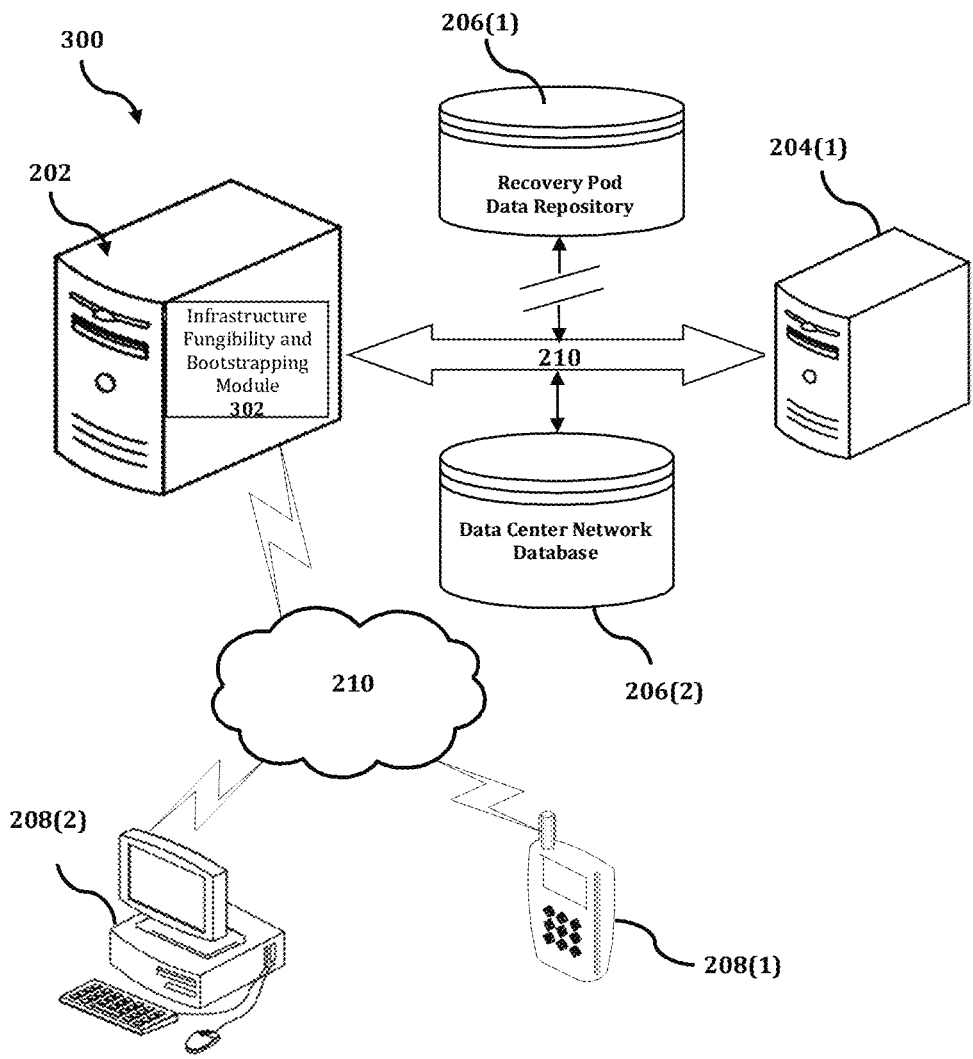
FIG. 3 shows an exemplary system for implementing a method for reconstructing a data center in response to a disabling event or interruption.

The IFB device 202 is described and illustrated in FIG. 3 as including an infrastructure fungibility and bootstrapping module 302, although it may include other rules, policies, modules, databases, or applications, for example. As will be described below, the infrastructure fungibility and bootstrapping module 302 is configured to implement a method for reconstructing a data center in response to a disabling event or interruption.

An exemplary process 300 for implementing a mechanism for reconstructing a data center in response to a disabling event or interruption by utilizing the network environment of FIG. 2 is illustrated as being executed in FIG. 3. Specifically, a first client device 208(1) and a second client device 208(2) are illustrated as being in communication with IFB device 202. In this regard, the first client device 208(1) and the second client device 208(2) may be "clients" of the IFB device 202 and are described herein as such. Nevertheless, it is to be known and understood that the first client device 208(1) and/or the second client device 208(2) need not necessarily be "clients" of the IFB device 202, or any entity described in association therewith herein. Any additional or alternative relationship may exist between either or both of the first client device 208(1) and the second client device 208(2) and the IFB device 202, or no relationship may exist.

Further, IFB device 202 is illustrated as being able to access a recovery pod data repository 206(1) and a data center network database 206(2). The infrastructure fungibility and bootstrapping module 302 may be configured to access these databases for implementing a method for reconstructing a data center in response to a disabling event or interruption.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IFB device 202 via broadband or cellular communication. Of course, these embodiments are merely exemplary and are not limiting or exhaustive.

Upon being started, the infrastructure fungibility and bootstrapping module 302 executes a process for reconstructing a data center in response to a disabling event or interruption. An exemplary process for reconstructing a data center in response to a disabling event or interruption is generally indicated at flowchart 400 in FIG. 4.

Figure 4:
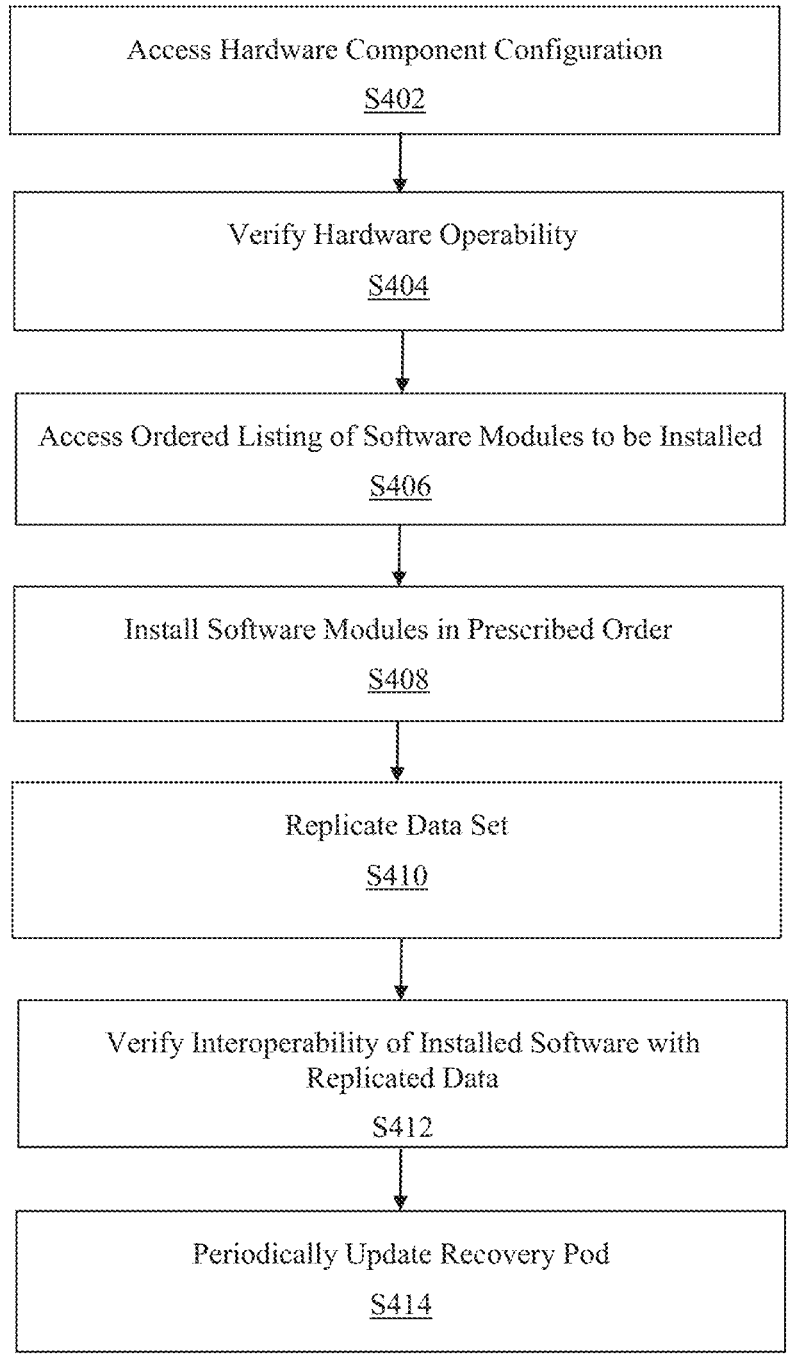
FIG. 4 is a flowchart of an exemplary process for implementing a method for reconstructing a data center in response to a disabling event or interruption.

In process 400 of FIG. 4, at step S402, information that indicates a predetermined hardware component configuration of the data center is accessed. In an exemplary embodiment, the predetermined hardware component configuration of the data center includes a list of hardware components that are intended to be included in the data center and instructions for ensuring that the components are physically arranged and electrically connected in a correct and proper manner. In an exemplary embodiment, the predetermined hardware component configuration may be referred to as a "base management cluster" and may be stored in the recovery pod data repository 206(1).

At step S404, the infrastructure fungibility and bootstrapping module 302 verifies that the hardware components are operable in accordance with the predetermined hardware component configuration. In an exemplary embodiment, the hardware components are installed and arranged via a continuous flow in of racks, with intelligent data center placement, to meet just-in-time demand. The predetermined hardware component configuration may be characterized as follows: consolidated rack patterns; multi-vendor using commodity hardware; intelligent data center placement; just-in-time delivery at all stages of pipeline, from vendor order to tenant handover; abstraction of physical infrastructure into virtualized workload pools; and ability to use cloud burst or free pool burst. The verification may be based on an autonomous build out of hardware racks, such that the racks are tagged to enable allocation based on workload requirements.

At step S406, the infrastructure fungibility and bootstrapping module 302 accesses an ordered listing of software modules to be installed in the data center. In an exemplary embodiment, the ordered listing of software modules may be stored in the recovery pod data repository 206(1), and may include a first subset of dedicated infrastructure software modules that corresponds to core critical services and a second subset of virtual modules that may implement a wide variety of functionalities and applications.

At step S408, the infrastructure fungibility and bootstrapping module 302 installs the software modules in a prescribed order. In an exemplary embodiment, the ordered listing may further include instructions for an order of installation of the software modules in order to ensure that each of the first subset of modules is installed before installing any of the second subset of modules. The use of a prescribed order also optimizes the efficiency of the process 400. The process optimization may be characterized by each of the following: data driven slicing based on client requirements, such as location, size, and/or workload type; data driven slicing based on existing utilization metrics; data driven slicing based on software defined policies; data driven slicing based on available capacity; stateless workload rebalancing based on hardware estate changes so as to maximize resources; spot clusters offered for temporary usage so as to utilize spare capacity; leveraging of quality-of-service in order to prioritize resources for application workloads; and/or portability to work together with any hypervisor solution.

At step S410, the infrastructure fungibility and bootstrapping module 302 replicates a data set. In an exemplary embodiment, the data set to be replicated is based on a backup data set that is periodically generated and stored in the recovery pod data repository 206(1), and may include various data types that relate to any software that is operational in the data center. Then, at step S412, the infrastructure fungibility and bootstrapping module 302 verifies an interoperability of the installed software modules with the replicated data, in order to ensure that the reconstructed data center is fully operational and functional. In an exemplary embodiment, the interoperability verification may be based on a predetermined standard that is stored in the recovery pod data repository 206(1).

At step S414, the infrastructure fungibility and bootstrapping module 302 updates the recovery pod data repository 206(1). In an exemplary embodiment, as illustrated in FIG. 3, the recovery pod data repository 206(1) is disconnectable from the communication network 210 to which the data center is connected, in order to protect the recovery pod data repository 206(1) from cyber attacks and other interruptions and failures that may occur with respect to the network 210.

In an exemplary embodiment, the updating of the recovery pod may include: connecting the recovery pod data repository 206(1) to the IFB device 202; temporarily disconnecting the IFB device 202 from the network 210, such that inbound communications are disabled; transmitting, from the IFB device 202 to the recovery pod data repository 206(1), a latest version of all of the relevant information to be stored in the recovery pod, including the hardware configuration information, the ordered listing of software modules, the backup data set to be replicated, and the interoperability verification standard; reconnecting the IFB device 202 to the network 210, such that inbound communications are receivable; and disconnecting the recovery pod data repository 206(1) from the IFB device 202.

Figure 5:
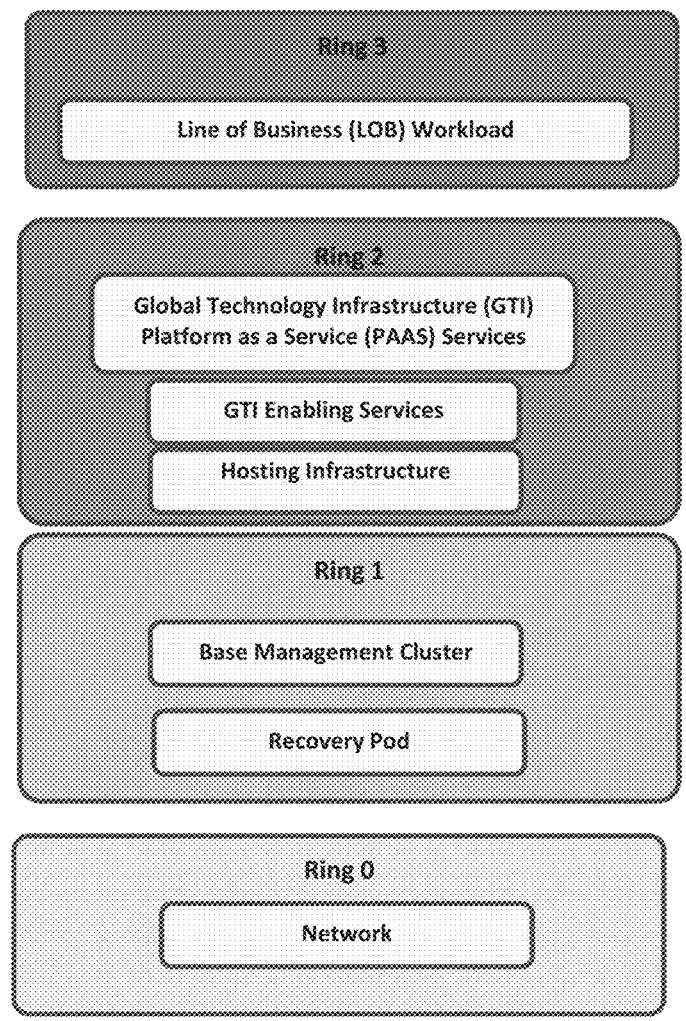
FIG. 5 is a diagram that illustrates a hierarchical structure of software modules that are included in a data center that is reconstructable in accordance with an exemplary embodiment.

FIG. 5 is a diagram that illustrates a hierarchical structure of software modules that are included in a data center that is reconstructable in accordance with an exemplary embodiment.

As shown in FIG. 5, the hierarchical structure 500 may be organized as a hierarchy of software levels, labeled herein as "rings". At the lowest level, i.e., Ring 0, the network on which the data center resides is included. In an exemplary embodiment, the Ring 0 network may be a local area network (LAN), a wide area network (WAN), or the Internet.

The next hierarchical level, i.e., Ring 1, includes the base management cluster and the recovery pod. In an exemplary embodiment, the base management cluster implements a fully automated bootstrap of all components from either the recovery pod directly or components that have been previously deployed earlier in a dependency tree, thus allowing for a data center to be built or rebuilt with no expectation of any pre-existing, long-lined or other capability outside of that provided by the recovery pod. In an exemplary embodiment, the full dependency map of all components within the base management cluster is understood and documented, and the bootstrapping process is automated. There is no external connectivity or pre-existing service, and all application architectures within the base management cluster will have updated to support being reconstructed in a stand-alone manner from defined and stored read-only artifacts.

In an exemplary embodiment, in the event of a cyber attack or other situation that renders the data center untrusted or unusable, the recovery pod provides a safe and consistent mechanism for bootstrapping all of the core critical services that are required for a fully functional data center. In an exemplary embodiment, the recovery pod implements each of the following: a delivery of a control plane for all core critical services required to bootstrap the data center; an ability to store software, images, and configurations in a version control system; and capabilities to continuously scan, validate, and harden recovery pod content and perimeter.

Referring again to FIG. 5, the next level of the hierarchy is labeled as Ring 2 and includes each of the following: a set of software services that correspond to Global Technology Infrastructure (GTI) Platform as a Service (PAAS) services; GTI enabling services; and modules that correspond to hosting infrastructure. The next level of the hierarchy is labeled as Ring 3 and includes modules that correspond to line of business workload applications and functionalities.

Figure 6:
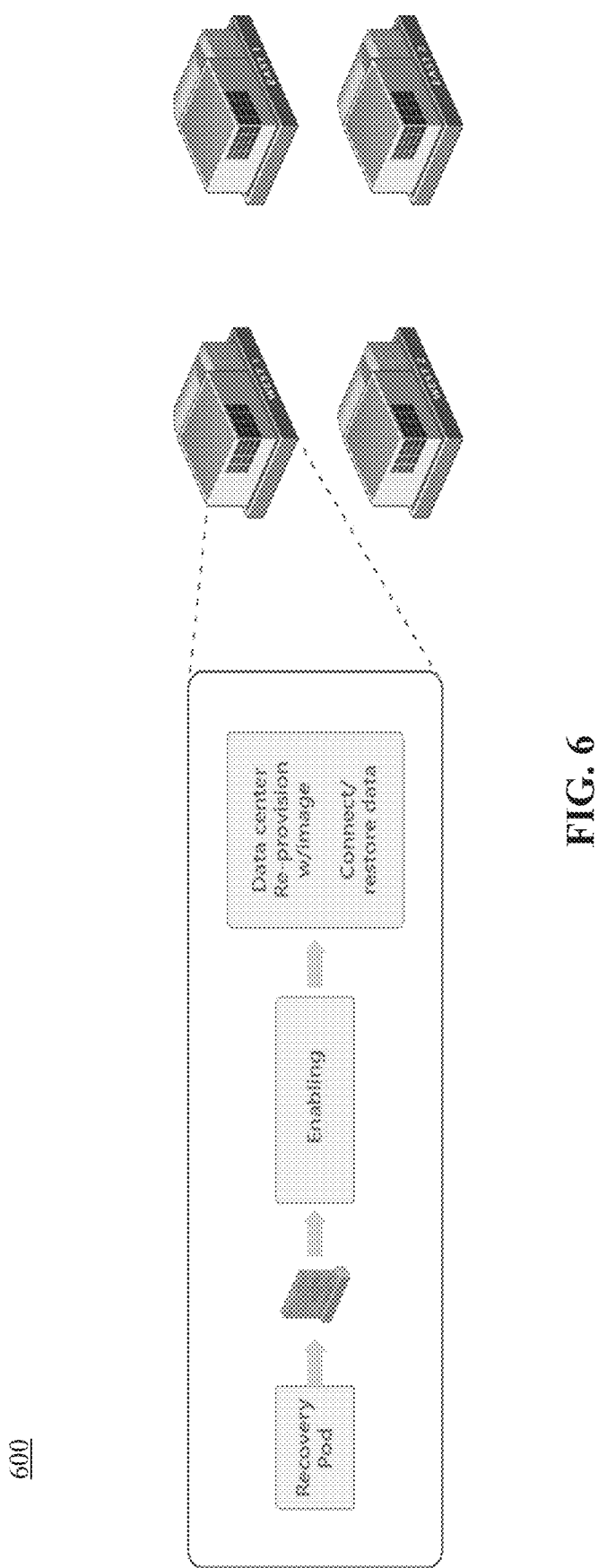
FIG. 6 is a diagram that illustrates a functionality of a recovery pod in conjunction with a method for reconstructing a data center in response to a disabling event or interruption, in accordance with an exemplary embodiment.

FIG. 6 is a diagram 600 that illustrates a functionality of a recovery pod in conjunction with a method for reconstructing a data center in response to a disabling event or interruption, in accordance with an exemplary embodiment.

In an exemplary embodiment, the recovery pod is implemented in accordance with the following: First, at most times, the recovery pod is not connected to the data center network. For example, the recovery pod may be disconnected from the data center network during at least 99% of the time, and connected to the network during a maximum of 1% of the time. During the connection time, the recovery pod replicates and updates various sets of data, such as the hardware configuration information, the ordered listing of software modules, and the application data, but all inbound traffic and communications are disabled during this time, for security and protection from external events. Then, when the replicating and updating is completed, the recovery pod is disconnected from the data center network.

In an exemplary embodiment, the recovery pod runs virtual copies of all key required applications and merely replicates the data set; no load other than replication is run against the software included in the recovery pod. Further, in an exemplary embodiment, most or all applications are virtualized. Regarding the connection and disconnection of the recovery pod from the data center network, in an exemplary embodiment, the connection and disconnection process is implemented via an "out of band" solution that is external to the data center network, in order to ensure that this solution is not able to be compromised.

Figure 7:
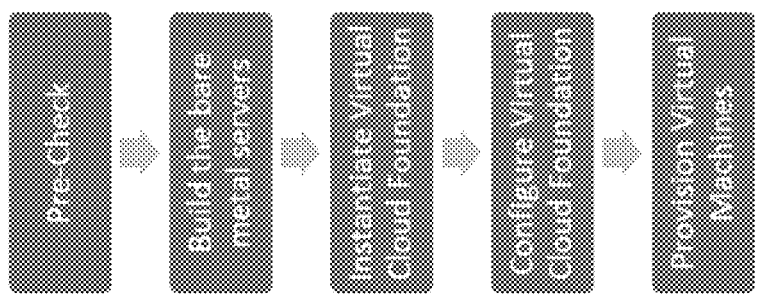
FIG. 7 is a diagram that illustrates an exemplary process for reconstructing a base management cluster included in a data center, in accordance with an exemplary embodiment.

FIG. 7 is a diagram that illustrates an exemplary process 700 for reconstructing a base management cluster included in a data center, in accordance with an exemplary embodiment. In the first step of the process 700, a pre-check is performed in order to ensure that the network is ready and configured. In the second step of the process 700, the bare metal servers are built. In an exemplary embodiment, the building steps entails leveraging a digital rebar provisioning tool to wipe the drives, install the firmware, configure the bios, and install ESX software.

In the third step of the process 700, a virtual cloud foundation (vCF) is instantiated by installing software that configures an ESX Cluster and installs a virtual storage area network (vSAN) for storage. In the fourth step of the process 700, the virtual cloud foundation is configured for tenant usage. Finally, in the fifth step of the process 700, virtual machines are provisioned. In an exemplary embodiment, the provisioning of virtual machines is implemented by instantiating a "build" virtual machine, which automatically runs an application to download artifacts, installs images to cluster, executes a Terraform file to create virtual machines, and calls a Blueprint to install the application.

Accordingly, with this technology, an optimized process for reconstructing a data center in response to a disabling event or interruption is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for reconstructing an electronic data processing facility, the method being implemented by at least one processor, the method comprising:
    accessing, by the at least one processor, information that indicates a predetermined arrangement of hardware components included in the electronic data processing facility;
    verifying, by the at least one processor, that the hardware components are operational based on the predetermined arrangement;
    accessing, by the at least one processor, information that indicates a predetermined order of software modules to be installed in the electronic data processing facility;
    installing, by the at least one processor, the software modules based on the predetermined order;
    accessing, by the at least one processor, information that indicates a predetermined data set to be stored in a memory of the electronic data processing facility; and
    verifying, by the at least one processor, that the installed software modules and the stored data set are operational based on a predetermined standard; and
    reconstructing a base management cluster included in the electronic data processing facility,
    wherein the reconstructing of the base management cluster includes:
        pre-checking to determine whether a network is ready and configured;
        building bare servers;
        instantiating a virtual cloud foundation (VCF) by installing software that configures an ESX cluster and installs a virtual storage area network (vSAN);
        configuring the VCF for tenant usage; and
        provisioning virtual machines.

2. The method of claim 1, wherein the predetermined order of software modules includes a first subset of dedicated infrastructure modules and a second subset of virtual modules, and wherein each of the dedicated infrastructure modules is to be installed before installing any of the virtual modules.

3. The method of claim 1, wherein each of the information that indicates the predetermined arrangement of hardware components, the information that indicates the predetermined order of software modules to be installed, the information that indicates the predetermined data set to be stored, and the predetermined standard is stored in a recovery pod database.

4. The method of claim 3, further comprising periodically updating the information stored in the recovery pod database by:
    connecting the recovery pod database to the electronic data processing facility;
    disconnecting the electronic data processing facility from an external network such that inbound communications are disabled;
    obtaining, from the electronic data processing facility, a latest version of the information stored in the recovery pod database;
    reconnecting the electronic data processing facility to the external network such that inbound communications are receivable; and
    disconnecting the recovery pod database from the electronic data processing facility.

5. The method of claim 1, wherein the information that indicates the predetermined arrangement of hardware components includes at least one instruction for ensuring that the hardware components are physically arranged and electrically connected in a correct manner.

6. The method of claim 1, wherein the predetermined order of software modules is based on a hierarchy of software levels that includes a lowest level that is to be installed before a second lowest level and a highest level that is to be installed after a second highest level.

7. The method of claim 6, wherein the lowest level of the hierarchy of software levels includes software modules that relate to a network on which the electronic data processing facility resides.

8. The method of claim 7, wherein the second lowest level of the hierarchy of software levels includes a recovery pod of software modules that stores a backup version of the electronic data processing facility and the base management cluster of software modules that implements a fully automated bootstrap of all components of the electronic data processing facility based on the stored backup version of the electronic data processing facility.

9. The method of claim 8, wherein a third lowest level of the hierarchy of software levels includes software modules that relate to Global Technology Infrastructure (GTI) Platform as a Service (PAAS) services, software modules that relate to GTI enabling services, and software modules that relate to hosting infrastructure.

10. The method of claim 9, wherein the highest level of the hierarchy of software levels includes software modules that relate to workload applications and functionalities corresponding to a predetermined line of business.

11. A computing apparatus for reconstructing an electronic data processing facility, the computing apparatus comprising:
a processor;
a memory; and
a communication interface coupled to each of the processor and the memory,
wherein the processor is configured to:
access, via the communication interface, information that indicates a predetermined arrangement of hardware components included in the electronic data processing facility;
verify that the hardware components are operational based on the predetermined arrangement;
access, via the communication interface, information that indicates a predetermined order of software modules to be installed in the electronic data processing facility;
install the software modules based on the predetermined order;
access, via the communication interface, information that indicates a predetermined data set to be stored in a memory of the electronic data processing facility; and
verify that the installed software modules and the stored data set are operational based on a predetermined standards;
reconstruct a base management cluster included in the electronic data processing facility,
wherein reconstruction of the base management cluster includes:
pre-checking to determine whether a network is ready and configured;
building bare metal servers;
instantiating a virtual cloud foundation (VCF) by installing software that configures an ESX cluster and installs a virtual storage area network (vSAN);
configuring the VCF for tenant usage; and
provisioning virtual machines.

12. The computing apparatus of claim 11, wherein the predetermined order of software modules includes a first subset of dedicated infrastructure modules and a second subset of virtual modules, and wherein each of the dedicated infrastructure modules is to be installed before installing any of the virtual modules.

13. The computing apparatus of claim 11, wherein each of the information that indicates the predetermined arrangement of hardware components, the information that indicates the predetermined order of software modules to be installed, the information that indicates the predetermined data set to be stored, and the predetermined standard is stored in a recovery pod database included in the memory.

14. The computing apparatus of claim 13, wherein the processor is further configured to periodically update the information stored in the recovery pod database by:
connecting the recovery pod database to the electronic data processing facility via the communication interface;
disconnecting the electronic data processing facility from an external network such that inbound communications are disabled;
obtaining, from the electronic data processing facility via the communication interface, a latest version of the information stored in the recovery pod database;
reconnecting the electronic data processing facility to the external network via the communication interface such that inbound communications are receivable; and
disconnecting the recovery pod database from the electronic data processing facility.

15. The computing apparatus of claim 11, wherein the information that indicates the predetermined arrangement of hardware components includes at least one instruction for ensuring that the hardware components are physically arranged and electrically connected in a correct manner.

16. The computing apparatus of claim 11, wherein the predetermined order of software modules is based on a hierarchy of software levels that includes a lowest level that is to be installed before a second lowest level and a highest level that is to be installed after a second highest level.

17. The computing apparatus of claim 16, wherein the lowest level of the hierarchy of software levels includes software modules that relate to a network on which the electronic data processing facility resides.

18. The computing apparatus of claim 17, wherein the second lowest level of the hierarchy of software levels includes a recovery pod of software modules that stores a backup version of the electronic data processing facility and the base management cluster of software modules that implements a fully automated bootstrap of all components of the electronic data processing facility based on the stored backup version of the electronic data processing facility.

19. The computing apparatus of claim 18, wherein a third lowest level of the hierarchy of software levels includes software modules that relate to Global Technology Infrastructure (GTI) Platform as a Service (PAAS) services, software modules that relate to GTI enabling services, and software modules that relate to hosting infrastructure.

20. The computing apparatus of claim 19, wherein the highest level of the hierarchy of software levels includes software modules that relate to workload applications and functionalities corresponding to a predetermined line of business.

* * * * *